(12) United States Patent
Meng et al.

(10) Patent No.: US 11,536,606 B2
(45) Date of Patent: Dec. 27, 2022

(54) OPTICAL DEVICE AND SPECTRAL DETECTION APPARATUS

(71) Applicant: BOE Technology Group Co., Ltd., Beijing (CN)

(72) Inventors: Xianqin Meng, Beijing (CN); Wei Wang, Beijing (CN); Jifeng Tan, Beijing (CN); Xiandong Meng, Beijing (CN); Xiaochuan Chen, Beijing (CN); Jian Gao, Beijing (CN); Fangzhou Wang, Beijing (CN); Pengxia Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 234 days.

(21) Appl. No.: 16/631,722

(22) PCT Filed: Jul. 23, 2019

(86) PCT No.: PCT/CN2019/097336
§ 371 (c)(1),
(2) Date: Jan. 16, 2020

(87) PCT Pub. No.: WO2020/024850
PCT Pub. Date: Feb. 6, 2020

(65) Prior Publication Data
US 2020/0386618 A1 Dec. 10, 2020

(30) Foreign Application Priority Data

Jul. 31, 2018 (CN) .......................... 201810867241.4

(51) Int. Cl.
*G01J 3/02* (2006.01)
*B01L 3/00* (2006.01)
(Continued)

(52) U.S. Cl.
CPC ....... *G01J 3/0294* (2013.01); *B01L 3/502715* (2013.01); *G01J 3/1895* (2013.01); *G02B 6/107* (2013.01); *G01J 2003/1286* (2013.01)

(58) Field of Classification Search
CPC .................. G01J 3/0294; G01J 3/1895; G01J 2003/1286; G01J 2003/2826;
(Continued)

(56) References Cited

U.S. PATENT DOCUMENTS 4,715,027 A * 12/1987 Mahapatra ......... G02B 6/12007
359/571
4,747,649 A * 5/1988 Heinen .............. G02B 6/12004
257/E31.055
(Continued)

FOREIGN PATENT DOCUMENTS

CN     1285924 A     2/2001
CN     1387059 A    12/2002
(Continued)

OTHER PUBLICATIONS

First Office Action, including Search Report, for Chinese Patent Application No. 201810867241.4, dated May 14, 2020, 19 pages.
(Continued)

*Primary Examiner* — Mohamed K Amara
(74) *Attorney, Agent, or Firm* — Westman, Champlin & Koehler, P.A.

(57) ABSTRACT

An optical device and a spectral detection apparatus are provided. The optical device includes an optical waveguide, including: a polychromatic light channel configured to transport a polychromatic light beam, and provided with a light incident surface for receiving the incident polychromatic light beam at an input end of the polychromatic light channel; a chromatic dispersion device arranged downstream from the polychromatic light channel in an optical
(Continued)

path and configured to separate the polychromatic light beam from the polychromatic light channel into a plurality of monochromatic light beams; and a plurality of monochromatic light channels arranged downstream from the chromatic dispersion device in the optical path and configured to respectively conduct the plurality of monochromatic light beams with different colors from the chromatic dispersion device. Monochromatic light output surfaces are respectively provided at output ends of the plurality of monochromatic light channels and configured to output the monochromatic light beams.

12 Claims, 11 Drawing Sheets

(51) Int. Cl.
 *G01J 3/18* (2006.01)
 *G02B 6/10* (2006.01)
 *G01J 3/12* (2006.01)

(58) Field of Classification Search
 CPC ........ G01J 3/0205; G01J 3/021; G01J 3/0218;
  G01J 3/0259; G01J 3/18; G01J 3/1838;
  G01J 3/36; B01L 3/502715; G02B 6/107;
  G02B 6/29304; G02B 6/124; G02B
  6/12004; G02B 6/12007; G02B 6/132;
  G02B 6/136; G02B 2006/12107; G02B
  2006/12164; G02B 6/125; G02B 6/13;
  G01N 21/25
 See application file for complete search history.

(56) References Cited

U.S. PATENT DOCUMENTS

| | | | | |
|---|---|---|---|---|
| 4,786,133 | A * | 11/1988 | Gidon | G02B 6/12004 385/14 |
| 5,228,103 | A * | 7/1993 | Chen | G01J 3/0259 359/333 |
| 5,396,328 | A | 3/1995 | Jestel et al. | |
| 5,581,639 | A * | 12/1996 | Davies | G02B 6/12007 385/10 |
| 5,608,826 | A * | 3/1997 | Boord | G02B 6/12007 359/15 |
| 6,483,964 | B1 * | 11/2002 | Beguin | G02B 6/12004 385/37 |
| 6,583,874 | B1 | 6/2003 | Suzuki et al. | |
| 7,324,195 | B2 * | 1/2008 | Packirisamy | G01N 21/05 385/12 |
| 7,330,614 | B1 * | 2/2008 | Mossberg | G02B 6/12007 385/10 |
| 7,447,403 | B2 * | 11/2008 | Kirk | G02B 6/12007 385/15 |
| 7,483,140 | B1 * | 1/2009 | Cho | G01N 21/553 356/448 |
| 7,783,150 | B2 * | 8/2010 | Steenblik | B42D 25/29 385/131 |
| 8,300,999 | B2 | 10/2012 | Qian et al. | |
| 8,561,456 | B2 * | 10/2013 | Meredith | G01M 3/047 73/40 |
| 8,629,981 | B2 * | 1/2014 | Martini | G01J 3/2803 356/417 |
| 8,926,906 | B2 * | 1/2015 | Packirisamy | G01N 21/645 422/82.07 |
| 9,366,647 | B2 | 6/2016 | Chang et al. | |
| 9,632,299 | B2 | 4/2017 | Sun et al. | |
| 10,240,978 | B2 * | 3/2019 | Santori | G02B 6/12007 |
| 10,280,456 | B2 | 5/2019 | Chang et al. | |
| 10,365,226 | B2 * | 7/2019 | Govyadinov | G01N 15/14 |
| 2002/0131685 | A1 * | 9/2002 | He | G02B 6/2938 385/24 |
| 2002/0176171 | A1 | 11/2002 | Berolo et al. | |
| 2004/0026617 | A1 * | 2/2004 | Gregori | G01N 30/84 250/288 |
| 2005/0151966 | A1 * | 7/2005 | Packirisamy | G01N 21/6428 356/328 |
| 2006/0164637 | A1 * | 7/2006 | Wang | G02B 6/1225 356/301 |
| 2007/0077595 | A1 * | 4/2007 | Koo | B82Y 30/00 435/7.1 |
| 2008/0123095 | A1 * | 5/2008 | Hubner | G01J 3/28 356/328 |
| 2009/0097022 | A1 * | 4/2009 | Shen | B29D 11/00365 257/E21.597 |
| 2011/0150392 | A1 | 6/2011 | Qian et al. | |
| 2011/0272575 | A1 * | 11/2011 | Kim | B41J 2/1642 137/341 |
| 2013/0265566 | A1 * | 10/2013 | Smith | G01J 3/10 356/39 |
| 2014/0262783 | A1 | 9/2014 | Chang et al. | |
| 2014/0340476 | A1 | 11/2014 | Sun et al. | |
| 2015/0146203 | A1 * | 5/2015 | Lai | B01L 3/502715 356/330 |
| 2016/0281158 | A1 | 9/2016 | Chang et al. | |
| 2016/0349183 | A1 * | 12/2016 | Lai | G01N 21/7746 |
| 2017/0343419 | A1 * | 11/2017 | Hopper | G01J 5/0255 |
| 2018/0043687 | A1 | 2/2018 | Govyadinov et al. | |
| 2018/0045562 | A1 | 2/2018 | Santori et al. | |
| 2019/0256910 | A1 | 8/2019 | Chang et al. | |
| 2020/0338549 | A1 * | 10/2020 | Zhao | B01L 3/502715 |
| 2020/0340859 | A1 * | 10/2020 | Meng | G01N 21/255 |

FOREIGN PATENT DOCUMENTS

| | | | | |
|---|---|---|---|---|
| CN | 101216579 | A | 7/2008 | |
| CN | 101308234 | A | 11/2008 | |
| CN | 101832927 | A | 9/2010 | |
| CN | 102804008 | A | 11/2012 | |
| CN | 103196887 | A | 7/2013 | |
| CN | 103698283 | A | 4/2014 | |
| CN | 104048919 | A | 9/2014 | |
| CN | 104950133 | A | 9/2015 | |
| CN | 105319629 | A | 2/2016 | |
| CN | 205537958 | U | 8/2016 | |
| CN | 107209107 | A | 9/2017 | |
| CN | 107250767 | A | 10/2017 | |
| CN | 206680492 | U | 11/2017 | |
| EP | 0468019 | B1 | 7/1994 | |
| EP | 2177938 | A1 * | 4/2010 | G02B 6/305 |
| EP | 3431940 | A1 * | 1/2019 | G01J 3/0205 |

OTHER PUBLICATIONS

Journal Article "Research on Integrated Etching Diffraction Grating WDM in Optical Communication", Retrieved on May 7, 2020, 48 pages.

* cited by examiner

OPTICAL DEVICE AND SPECTRAL DETECTION APPARATUS

CROSS-REFERENCE TO RELATED APPLICATION

This application is a Section 371 National Stage application of International Application No. PCT/CN2019/097336, filed on Jul. 23, 2019, which has not yet published, and claims priority to Chinese Patent Application No. 201810867241.4 filed on Jul. 31, 2018 in China National Intellectual Property Administration, the disclosures of which are incorporated herein by reference in their entireties.

TECHNICAL FIELD

Embodiments of the present disclosure relate to the field of optical detection, and in particular, to an optical device and a spectral detection apparatus.

BACKGROUND

The use of microfluid to reflect, transmit, or absorb light at specific wavelengths can achieve material calibration or quantitative analysis. However, the conventional spectrometer apparatus is usually so large that it can only be used in a laboratory. Therefore, it is desirable to provide a miniaturized spectrometer, increase a spectral range of the spectrometer, and reduce the cost of the spectrometer, so as to increase the application range of the spectrometer.

SUMMARY

In an embodiment of the present disclosure, it provides an optical device, comprising an optical waveguide, the optical waveguide comprising: a polychromatic light channel configured to transport a polychromatic light beam, and provided with a light incident surface for receiving an incident polychromatic light beam at an input end of the polychromatic light channel; a chromatic dispersion device arranged downstream from the polychromatic light channel in an optical path and configured to split the polychromatic light beam from the polychromatic light channel into a plurality of monochromatic light beams; and a plurality of monochromatic light channels arranged downstream from the chromatic dispersion device in the optical path and configured to respectively conduct the plurality of monochromatic light beams with different colors from the chromatic dispersion device, wherein monochromatic light output surfaces are respectively provided at output ends of the plurality of monochromatic light channels and configured to output the monochromatic light beams.

In some embodiments, the optical device further comprises a substrate, and the polychromatic light channel, the chromatic dispersion device, and the plurality of monochromatic light channels are arranged on a same substrate.

In some embodiments, the optical device further comprises: a first cladding layer on a first side surface of the polychromatic light channel; and a second cladding layer on a second side surface of the polychromatic light channel, wherein the second side surface is disposed opposite to the first side surface and closer to the substrate than the first side surface, and wherein a refractive index of the first cladding layer and a refractive index of the second cladding layer are both less than a refractive index of the polychromatic light channel.

In some embodiments, the second cladding layer is integrated with the substrate. In some embodiments, the polychromatic light channel, the chromatic dispersion device, and the plurality of monochromatic light channels are arranged in a same layer.

In some embodiments, each of the plurality of monochromatic light channels comprises a sub-optical waveguide.

In some embodiments, the polychromatic light channel, the chromatic dispersion device, and the plurality of monochromatic light channels are made of a same material.

In some embodiments, the chromatic dispersion device comprises a reflective blazed grating.

In some embodiments, the optical device further comprises a reflective layer disposed on a side of a grating surface of the reflective blazed grating away from a polychromatic light output surface of the polychromatic light channel.

In some embodiments, the light incident surface is provided with a transmissive grating or the polychromatic light channel comprises a reflective bevel adjacent to the light incident surface.

In some embodiments, a reflective bevel or a transmissive grating is provided in the first cladding layer, and the reflective bevel or the transmissive grating is located upstream from the light incident surface in the optical path and configured to guide an incident light beam into the light incident surface.

In some embodiments, the monochromatic light output surface of each monochromatic light channel is provided with mesh dots or an extraction grating for outputting one of the plurality of monochromatic light beams.

In some embodiments, the optical device further comprises a light source for emitting the polychromatic light beam, wherein the light incident surface is arranged to receive the polychromatic light beam from the light source.

An embodiment of the present disclosure provides a spectral detection apparatus, comprising: the optical device according to any one of the above previous embodiments; and a measurement device opposite to the optical device, wherein the measurement device comprises a microfluidic channel and a plurality of light sensing units; the plurality of monochromatic light channels are arranged on one side of the microfluidic channel; the plurality of light sensing units are arranged on the other side of the microfluidic channel opposite to the plurality of monochromatic light channels; a light receiving surface of each light sensing unit faces a light output surface of one monochromatic light channel.

In some embodiments, a substrate of the optical device is a first substrate, the measurement device further comprises a second substrate, and the plurality of light sensing units and the microfluidic channel are arranged on the second substrate.

In some embodiments, the polychromatic light channel, the chromatic dispersion device, the plurality of monochromatic light channels, the microfluidic channel, and the plurality of light sensing units are arranged on a same substrate.

BRIEF DESCRIPTION OF THE DRAWINGS

In order to more clearly illustrate the embodiments of the present disclosure or the technical solutions in the prior art, the drawings to be used in the description of the embodiments or the prior art will be briefly described below. Obviously, the drawings referred to in the following description only represent some embodiments of the present disclosure, and other drawings may be obtained by those skilled in the art based on these drawings without any creative efforts.

DETAILED DESCRIPTION OF EMBODIMENTS

Figure 1:
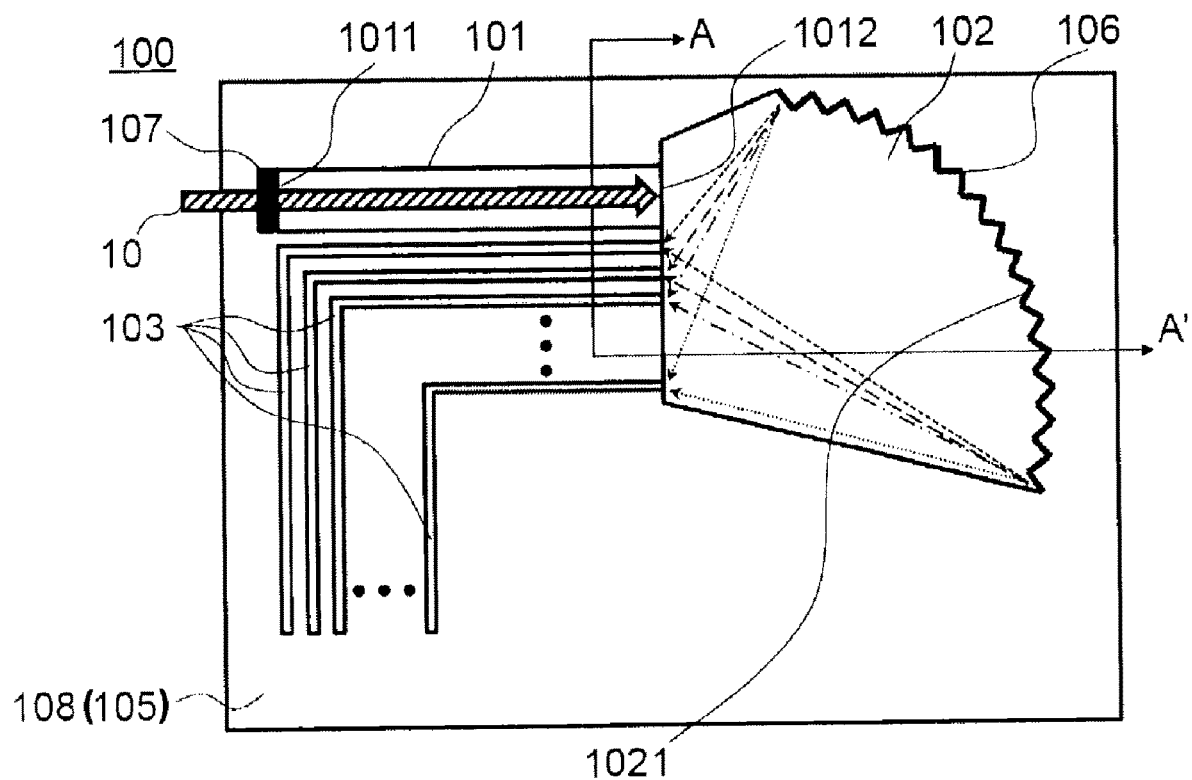
FIG. 1 is a top view of an optical device according to an embodiment of the present disclosure.

The technical solutions in the embodiments of the present disclosure will be clearly and completely described below with reference to the accompanying drawings in the embodiments of the present disclosure. It is obvious that the described embodiments are only a part of the embodiments of the present disclosure, but not all of the embodiments. All other embodiments obtained by those skilled in the art based on the embodiments of the present disclosure without any creative efforts fall within the scope of the present disclosure.

In the specification and the drawings, the same or similar reference numerals refer to the same or similar parts or components. For sake of clarity, the drawings are not necessarily drawn in scale, and some well-known parts and structures may be omitted from the drawings.

Unless otherwise defined, the technical terms or scientific terms used in the present disclosure shall have the ordinary meanings which may be understood by those skilled in the art to which the present disclosure belongs. The terms "first", "second", and the like used in the present disclosure do not indicate any order, quantity, or importance, but are only used to distinguish different components. The word "a" or "an" does not exclude multiple items. The word "comprise", "include" or the like means that the element or item preceding the word encompasses the elements or items and their equivalents listed after the word, but does not exclude other elements or items. The word "connect", "join" or the like is not limited to physical or mechanical connection, but may include electrical connection, no matter it is direct or indirect. The words "up", "down", "left", "right", "top", "bottom", etc. are only intended to indicate relative positional relationships. Therefore, if an absolute position of a described object changes, this relative positional relationship may change accordingly. When one element such as a layer, film, region, or base substrate is referred to as being "on" or "under" another element, the one element can be "directly" located "on" or "under" the another element, or there may be an intermediate element therebetween.

Figure 2:
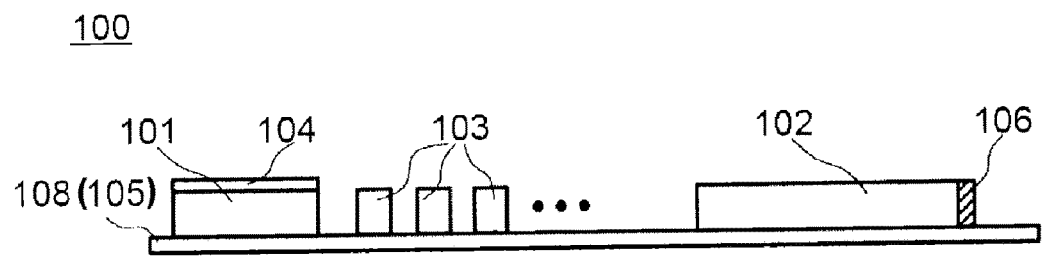
FIG. 2 is a cross-sectional view of the optical device shown in FIG. 1, taken along a line A-A'.

In an embodiment of the present disclosure, an optical device is provided. As shown in FIG. 1 and FIG. 2, the optical device 100 includes an optical waveguide for transmitting light, and the optical waveguide includes a polychromatic light channel 101, a chromatic dispersion device 102, and a plurality of monochromatic light channels 103. The polychromatic light channel 101 is configured to transport a polychromatic light beam 10. A light incident surface 1011 for receiving the incident polychromatic light beam is provided at an input end of the polychromatic light channel 101. The light incident surface 1011 is configured to receive the incident polychromatic light beam 10 (shown by an arrow in FIG. 1). The chromatic dispersion device 102 is arranged downstream from the polychromatic light channel 101 in an optical path, and the chromatic dispersion device 102 is configured to split the polychromatic light beam 10 from the polychromatic light channel 101 into a plurality of monochromatic light beams. The polychromatic light channel 101 can provide the polychromatic light beam to the chromatic dispersion device 102 through a polychromatic light output surface 1012. The plurality of monochromatic light channels 103 are arranged downstream from the chromatic dispersion device 102 in the optical path, and the plurality of monochromatic light channels 103 are configured to respectively conduct the plurality of monochromatic light beams with different colors from the chromatic dispersion device 102. Monochromatic light output surfaces 1031 are respectively provided at output ends of the plurality of monochromatic light channels 103 and configured to output the monochromatic light beams. The plurality of monochromatic light channels 103 can output the plurality of monochromatic light beams separately, for example, for irradiating a microfluid. As an example, the plurality of monochromatic light channels 103 may include a first color light channel, a second color light channel, a third color light channel, and so on.

In some embodiments, the optical device 100 may further include a substrate 108, and the polychromatic light channel 101, the chromatic dispersion device 102, and the plurality of monochromatic light channels 103 are arranged on the same substrate 108.

The use of integrated structure of the optical waveguide including a polychromatic light channel, a chromatic dispersion device, and monochromatic light channels can miniaturize the optical device. For example, it can be used to implement a glass substrate-based spectral detection apparatus (for example, a spectrometer), and it is particularly suitable for microfluidic detection.

In some embodiments, the polychromatic light channel 101, the chromatic dispersion device 102, and the plurality of monochromatic light channels 103 may be arranged in the same layer, as shown in FIG. 2. In the embodiments of the present disclosure, the optical device includes a polychromatic light channel, a chromatic dispersion device, and a plurality of monochromatic light channels arranged in the same layer, which can simplify the basic structure and the manufacturing method of the spectrum testing system. The optical device described in the embodiments of the present disclosure can be applied to the fields of physics, chemistry, biology, medicine, agronomy, etc., for material analysis or molecular analysis.

In the context of the present disclosure, the arrangement of two or more objects in the same layer means that the two or more objects are disposed on the same surface or in the same layer. In some embodiments of the present disclosure, the arrangement of two or more objects in the same layer also means that the two or more objects are formed from the same material (for example, but not limited to, by the same patterning process).

Figure 6:
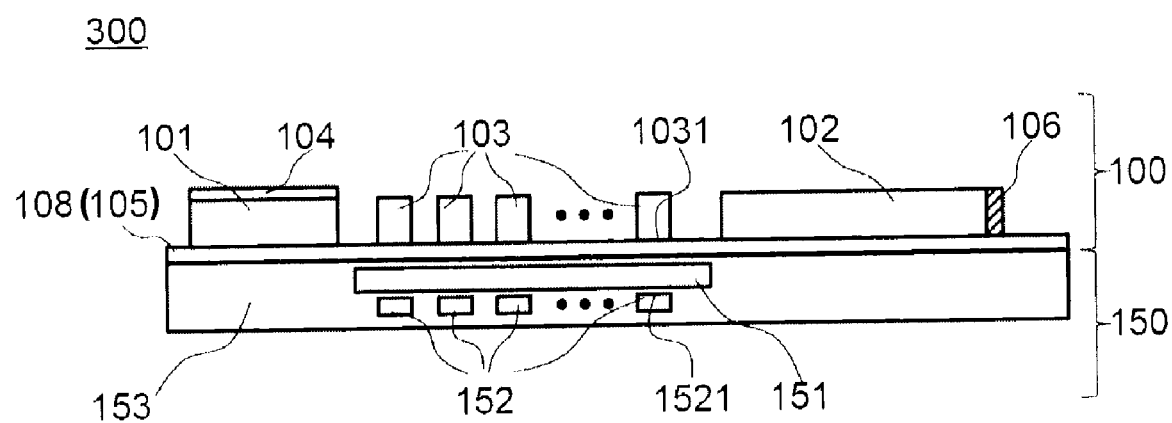
FIG. 6 is a cross-sectional view of a spectral detection apparatus according to an embodiment of the present disclosure.

In some embodiments, as shown in FIGS. 2 and 6, the polychromatic light channel 101, the chromatic dispersion device 102, and the plurality of monochromatic light channels 103 are arranged in the same layer. In some embodiments, the polychromatic light channel 101, the chromatic dispersion device 102, and the plurality of monochromatic light channels 103 are located on the same surface or in the same layer. In some embodiments, the polychromatic light channel 101, the chromatic dispersion device 102, and the plurality of monochromatic light channels 103 are formed in the same layer of material. In this way, it can simplify the process.

In some embodiments, as shown in FIGS. 1-6 and 8, each monochromatic light channel is a sub-optical waveguide. This facilitates the structural integration of the plurality of monochromatic light channels 103. For example, a plurality of such sub-optical waveguides may be combined to form a column of optical waveguides.

In some embodiments, as shown in FIG. 2, the optical device 100 further includes a first cladding layer (or referred to as an upper cladding layer) 104 disposed on a first side surface (an upper surface in FIG. 2) of the polychromatic light channel 101, and a second cladding layer (a lower cladding layer) 105 disposed on a second side surface (a lower surface in FIG. 2) of the polychromatic light channel 101. The second side surface of the polychromatic light channel 101 is opposite to the first side surface and is closer to the substrate 108 than the first side surface. Refractive index of the first cladding layer 104 and refractive index of the second cladding layer 105 are less than refractive index of the polychromatic light channel 101. This facilitates total reflection at an interface of the polychromatic light channel 101 and each of the first cladding layer 104 and the second cladding layer. In the embodiment of FIG. 2, the second cladding layer is composed of the substrate 108, or the second cladding layer 105 and the substrate 108 are integrated with each other. This approach helps to simplify the process. However, the embodiments of the present disclosure are not limited thereto, for example, the second cladding layer may also be formed of other structures, such as a transparent resin layer (for example, located between the second side surface of the polychromatic light channel 101 and the substrate 108).

According to the principle of total internal reflection, by means of arranging the first cladding layer and/or the second cladding layer, the light entering the polychromatic light channel can be more effectively confined in the polychromatic light channel Thereby, the light utilization efficiency is improved. In addition, the first cladding layer and the second cladding layer can also serve as protective layers to avoid damage to the polychromatic light channel.

In some embodiments, as shown in FIG. 1 and FIG. 2, the optical device 100 includes a lower cladding layer 105 disposed on a lower surface of the polychromatic light channel 101 and formed by the substrate 108; and the polychromatic light channel 101, the chromatic dispersion device 102, and the plurality of monochromatic light channels 103 are arranged on the substrate 108.

With the above arrangement, the material layer arranged on the substrate can be patterned by using, for example, a patterning process, to obtain the polychromatic light channel, the chromatic dispersion device, and the plurality of monochromatic light channels. Thereby, it further simplifies the basic structure and the manufacturing method for the spectrum testing.

In some embodiments, the polychromatic light channel 101, the chromatic dispersion device 102, and the plurality of monochromatic light channels 103 are made from the same material.

In some embodiments, the polychromatic light channel, the chromatic dispersion device, and the plurality of monochromatic light channels are formed from the same material. For example, silicon nitride ($SiN_x$) can be used to make the polychromatic light channel, the chromatic dispersion device, and the plurality of monochromatic light channels on a glass substrate or a $SiO_2$ substrate. Specifically, a layer of silicon nitride may be formed on a glass substrate, and then the layer of silicon nitride is patterned by a patterning process, so as to obtain the polychromatic light channel 101, the chromatic dispersion device 102, and the plurality of monochromatic light channels as shown in FIG. 1. Since the refractive index of glass is about 1.52 and the refractive index of silicon nitride is about 1.9, the light beam can be effectively confined in the polychromatic light channel, the chromatic dispersion device, and the plurality of monochromatic light channels. Thereby, it further simplifies the basic structure and the manufacturing method for the spectrum testing.

In some embodiments, as shown in FIG. 1, the chromatic dispersion device 102 is a reflective blazed grating; and a grating surface 1021 of the reflective blazed grating faces a polychromatic light output surface 1012 of the polychromatic light channel.

With the above arrangement, the light beam from the polychromatic light channel is incident on the grating surface of the chromatic dispersion device 102. The grating surface splits the light beam from the polychromatic light channel into a plurality of monochromatic light beams. As shown in FIG. 1, multiple different line types represent a plurality of monochromatic light beams having different wavelengths. In the embodiment shown in FIG. 1, the light incident surface of the reflective blazed grating and the polychromatic light output surface are adjacent to each other. The light incident surface of the reflective blazed grating is coupled to the polychromatic light output surface 1012 of the polychromatic light channel 101, and the light output surface of the reflective blazed grating is coupled to the light incident surfaces of the plurality of monochromatic light channels 103. The above-mentioned arrangement is just an example, but the embodiments of the present disclosure are not limited thereto. For example, the positions of the light incident surface and the light output surface of the reflective blazed grating may be adjusted according to actual requirements.

In some embodiments, the chromatic dispersion device may be a holographic grating. The holographic grating may be designed and optimized for different incident angles and positions to obtain gratings with different parameters. In some embodiments, the chromatic dispersion device may also be a linear gradient filter or the like. The light output surface of the chromatic dispersion device is arranged such that the plurality of split monochromatic light beams are coupled to the plurality of monochromatic light channels 103.

Optionally, in some embodiments, as shown in FIG. 1 and FIG. 2, the optical device 100 further includes a reflective layer 106 disposed on a side of the grating surface 1021 away from the polychromatic light output surface 1012 of the polychromatic light channel 101.

With the above arrangement, the light utilization efficiency of the reflective blazed grating is further improved. The reflective layer 106 may be formed on the outside of the grating surface 1021 (that is, the side of the polychromatic light output surface 1012 away from the polychromatic light channel 101) by using for example a sputtering process. The material of the reflective layer 106 may be aluminum, silver or other reflective materials.

Figure 3:
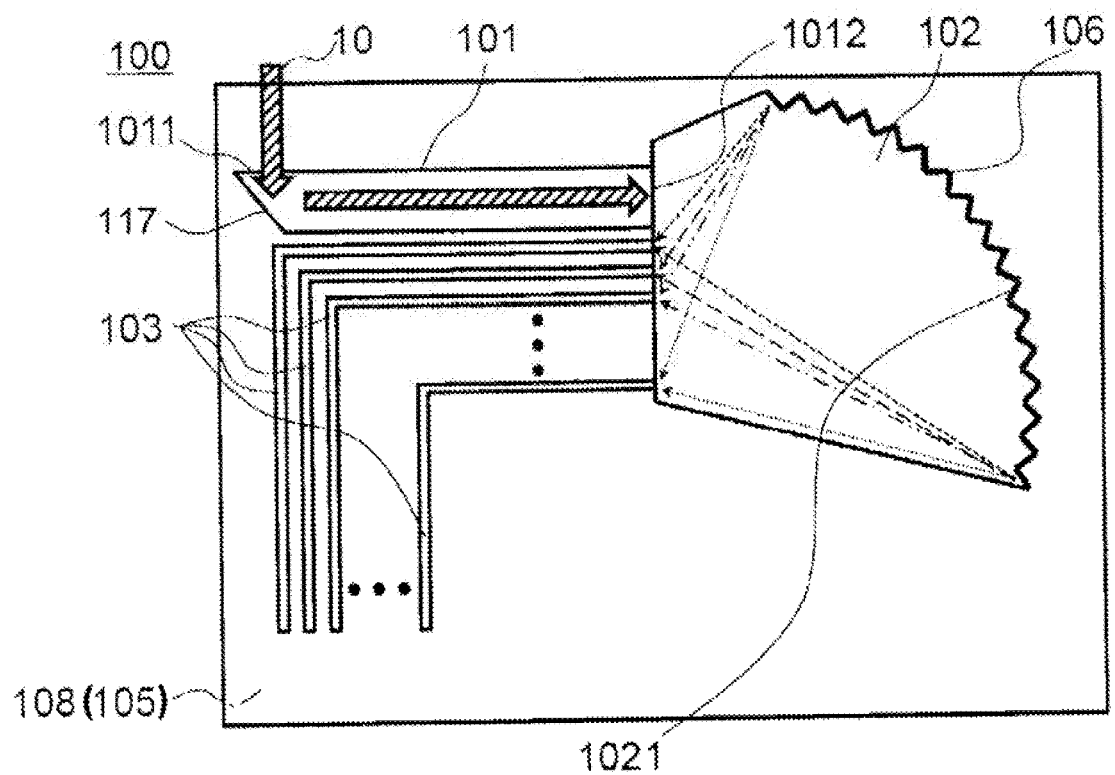
FIG. 3 is a top view of an optical device according to another embodiment of the present disclosure.

In some embodiments, as shown in FIG. 1, the light incident surface 1011 of the polychromatic light channel 101 is provided with a transmissive grating 107 for inputting light. The transmissive grating 107 may be made by using, for example, a nanoimprint process, thereby increasing the dispersion of the incident light and further enhancing the color separation effect of the chromatic dispersion device 102. In some embodiments, as shown in FIG. 3, the polychromatic light channel 101 is provided with a reflective bevel 117 adjacent to the light incident surface 1011 for inputting light beam. The reflective bevel 117 may be designed according to the direction of the incident light beam and the position of the light source, so that the incident light enters the polychromatic light channel 101 at a desired angle.

Figure 11A:
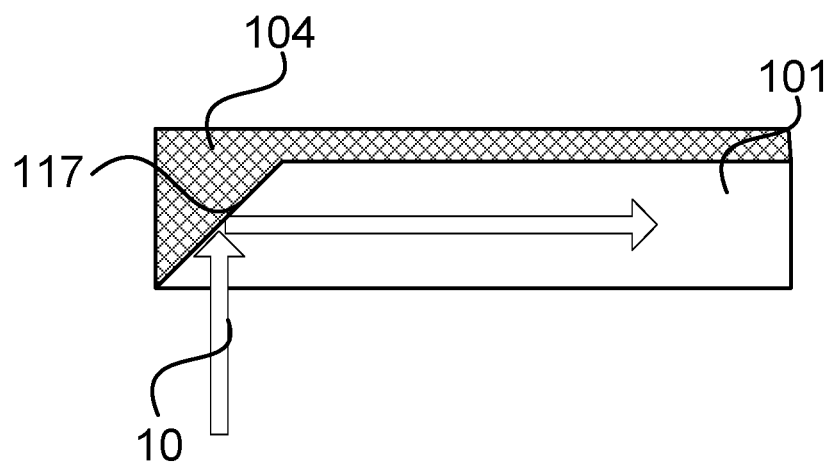
FIGS. 11A and 11B illustrate an exemplary structure in which a reflective bevel is formed near a light incident surface of a polychromatic light channel and an exemplary structure in which a transmissive grating is formed on a light incident surface of a polychromatic light channel, respectively.
Figure 11B:
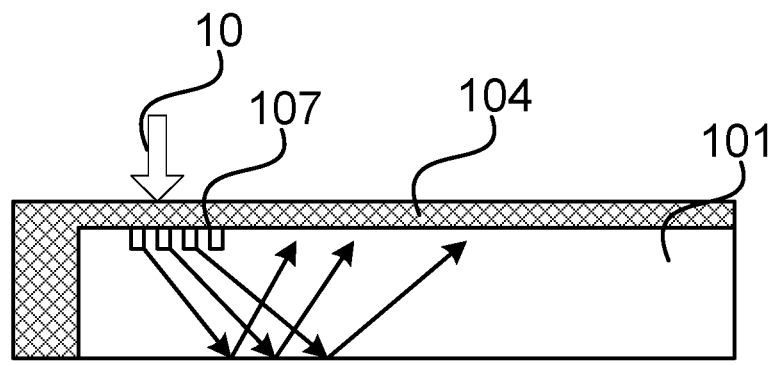
Figure 11C:
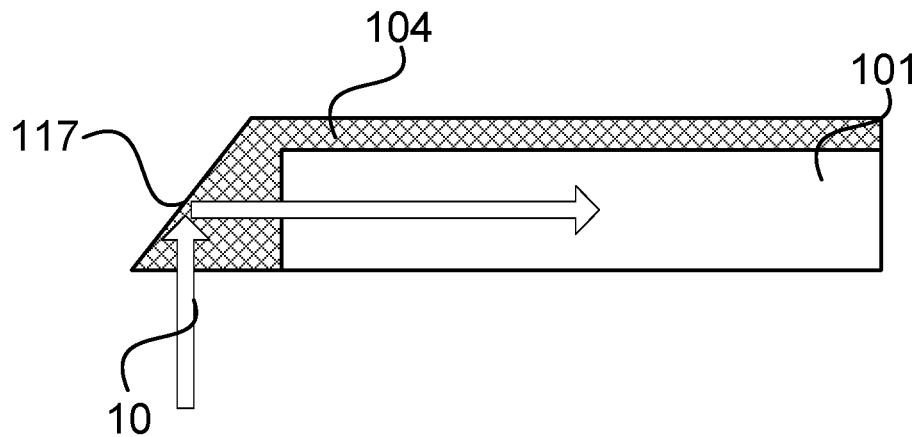
FIGS. 11C and 11D illustrate an exemplary structure in which a reflective bevel is formed on a first cladding layer and an exemplary structure in which a transmissive grating is formed on a first cladding layer, respectively.
Figure 11D:
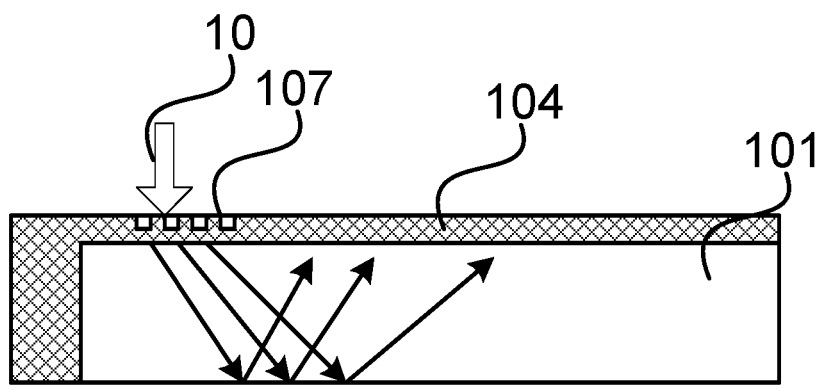

It should be noted that the light incident surface 1011 of the polychromatic light channel 101 may be an end surface or a side surface at one side (for example, an upper surface, a lower surface, or a peripheral surface) of the polychromatic light channel 101, and accordingly, the transmissive grating 107 or the reflective bevel 117 may be provided on, for example, an upper surface, a lower surface, or a peripheral surface. FIG. 11A illustrates a case where the reflective bevel 117 is disposed on the upper surface of the polychromatic light channel 101, and the light beam reflected by the reflective bevel 117 into the polychromatic light channel 101 is transmitted as parallel as possible to the upper and lower surfaces of the polychromatic light channel to reduce optical loss. FIG. 11B illustrates a case where the transmissive grating 107 is disposed on the upper surface of the polychromatic light channel 101. Due to the diffraction effect of the transmissive grating 107, the light beam entering the polychromatic light channel 101 has a certain inclination angle so that it satisfies the condition of total reflection when the light beam is reflected by a side wall of the polychromatic light channel 101, and the transmissive grating 107 has a certain diffusion effect on the light beam. In the case where a first cladding layer 104 is provided, the transmissive grating 107 or the reflective bevel 117 may also be formed in the first cladding layer 104, as shown in FIGS. 11C and 11D. In this case, the reflective bevel 117 or the transmissive grating 107 is located upstream from the light incident surface 1011 of the polychromatic light channel 101 in the optical path and is configured to guide the incident light beam into the light incident surface 1011. As an example, an orthographic projection of the reflective bevel 117 or the transmissive grating 107 on a plane where the light incident surface 1011 of the polychromatic light channel 101 is located is within the light incident surface 1011. The above embodiments are merely exemplary, and the embodiments of the present disclosure are not limited thereto.

Figure 4:
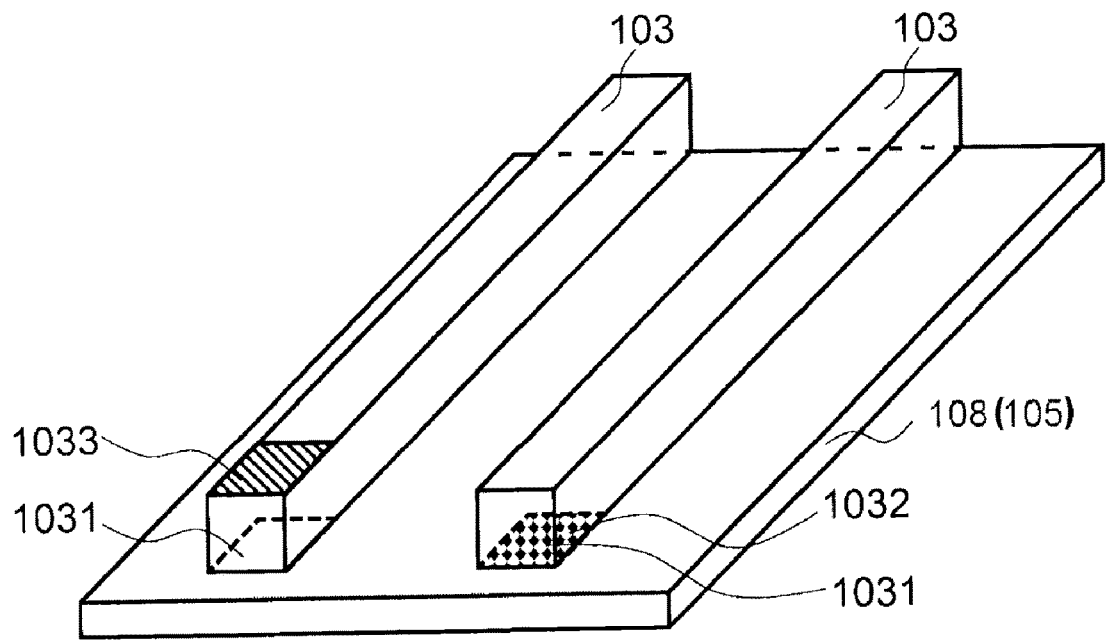
FIG. 4 is a schematic partial structural view of a monochromatic light channel according to an embodiment of the present disclosure.

In some embodiments, as shown in FIG. 4, the monochromatic light output surface 1031 of each monochromatic light channel 103 is provided with mesh dots 1032 or an extraction grating 1033 for outputting one of the plurality of monochromatic light beams. In the embodiment of FIG. 4, the mesh dots 1032 or the extraction grating 1033 can be used to extract a monochromatic light beam from the light output surface 1031 located at the bottom of the monochromatic light channel 103, that is, the extracted monochromatic light beam is emitted toward the lower cladding layer 105. In other embodiments, an inclined plane may be arranged on the light output surface of each monochromatic light channel, so that the monochromatic light beam leaves the monochromatic light channel 103 in a desired direction.

Figure 5:
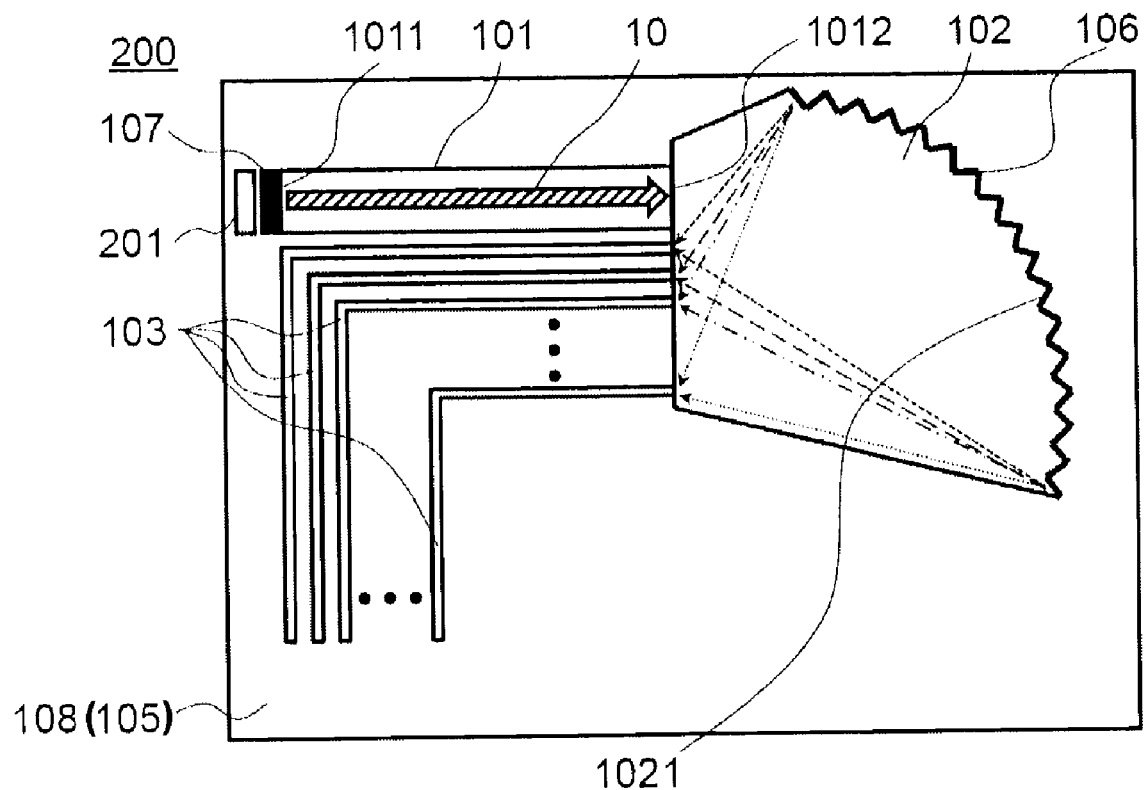
FIG. 5 is a top view of an optical device according to another embodiment of the present disclosure.

In some embodiments, as shown in FIG. 5, the optical device 200 may further include a light source 201 for emitting the incident light beam, wherein the light incident surface 1011 of the polychromatic light channel 101 is arranged to receive the incident light beam from the light source 201. In this embodiment, the optical device 200 can serve as a light source system.

The light source system may be used as a light source of a miniature spectrometer, thereby effectively reducing the thickness and volume of the miniature spectrometer. In addition, the light source system can be made based on a glass substrate and a patterning process, thus the patterning process can be used to prepare a light source system with desired parameters, which further improves the compatibility of the light source system.

The light source 201 may be a light emitting diode or a composite light source composed of a plurality of light emitting diodes (or laser diodes), so as to provide the optical device with a polychromatic light having a certain spectral range. It should be appreciated by those skilled in the art that the light source system 200 may utilize daylight or ambient light as incident light, so as to obtain a plurality of monochromatic light beams through the optical device. It should be noted that the light beams incident into the polychromatic light channel 101 in the optical device 100, 200 according to the embodiments of the present disclosure may be a polychromatic light beam having a certain spectral range (for example, a broad spectrum light beam such as a white light beam), but the embodiments of the present disclosure are not limited thereto.

Figure 7:
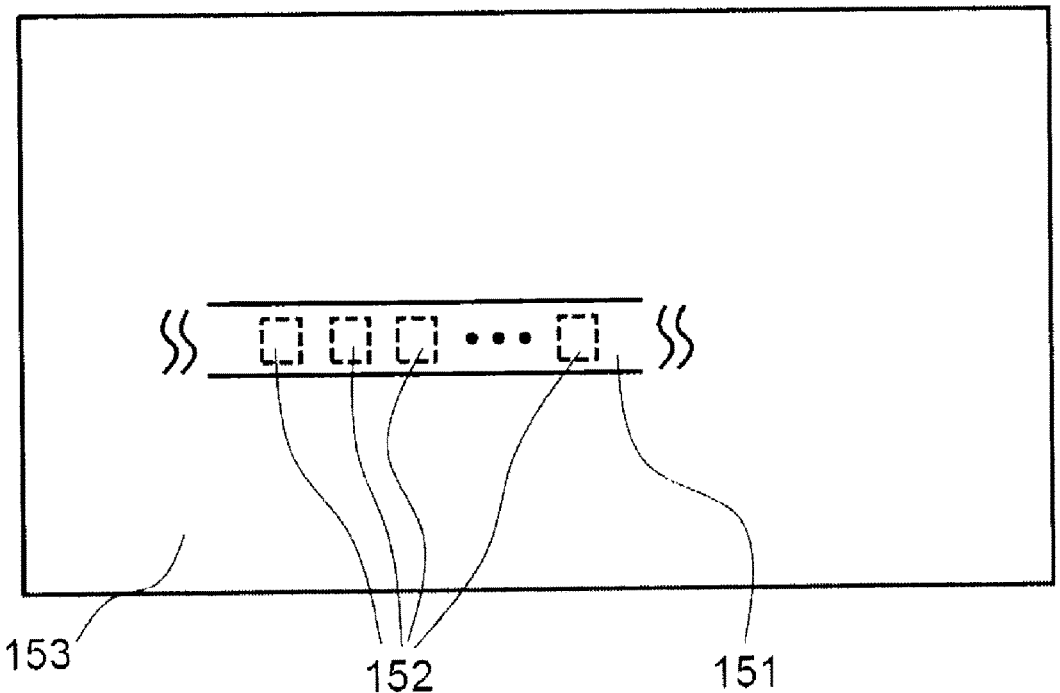
FIG. 7 is a top view of a measurement device in the embodiment shown in FIG. 6.

Embodiments of the present disclosure further provide a spectral detection apparatus. As shown in FIG. 6, the spectral detection apparatus 300 includes the optical devices 100 and 200 according to any one of the above embodiments and a measurement device 150 disposed opposite to the optical devices 100 and 200. In the embodiment of FIG. 6, the arrangement shown in FIG. 1 and FIG. 2 is used in the optical device 100, but the optical device in the present disclosure is not limited thereto. As shown in FIGS. 6 and 7, the measurement device 150 includes a microfluidic channel 151 and a plurality of light sensing units 152; the plurality of monochromatic light channels 103 are disposed on one side of the microfluidic channel 151; the plurality of light sensing units 152 are disposed on the other side of the microfluidic channel 151 opposite to the plurality of monochromatic light channels 103; a light receiving surface 1521 of each light sensing unit 152 faces a monochromatic light output surface 1031 of one monochromatic light channel 103.

In some embodiments, the plurality of light sensing units 152 are in one-to-one correspondence with the plurality of monochromatic light channels 103. Each light sensing unit 152 may include one or more light sensors. After the monochromatic light beam outputted by each monochromatic light channel 103 passes through the microfluidic channel 151, the intensity or wavelength of the monochromatic light beam will change. By means of the light sensing unit 152 corresponding to the monochromatic light channel 103, it is possible to obtain change information of the monochromatic light beam, thereby obtaining a spectrum measurement result.

In some embodiments, as shown in FIG. 6 and FIG. 7, assuming that the substrate 108 of the optical device 100 is a first substrate, the measurement device 150 further includes a second substrate 153, and the plurality of light sensing units 152 and the microfluidic channel 151 are disposed on the second substrate.

In the embodiments shown in FIG. 6 and FIG. 7, the optical device 100 and the measurement device 150 are arranged in a stacked manner, therefore the plurality of light sensing units 152 shown in FIG. 6 are arranged below the microfluidic channel 151. As an example, the optical device 100 and the measurement device 150 may be arranged on the same side of the first substrate 108. For example, in some embodiments, as shown in FIG. 8, the polychromatic light channel 101, the chromatic dispersion device 102, the plurality of monochromatic light channels 103, the microfluidic channel 151, and the plurality of light sensing units 152 are all disposed on the same side of the substrate 108.

Figure 8:
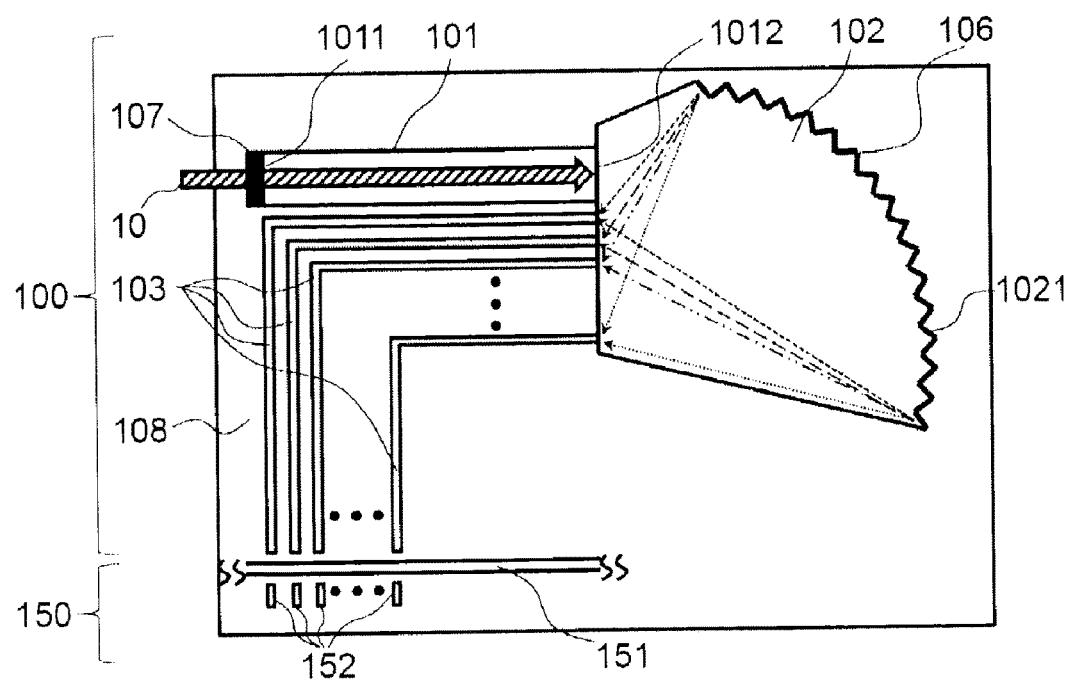
FIG. 8 is a top view of a spectral detection apparatus according to another embodiment of the present disclosure.

In addition, in the embodiment shown in FIG. 8, the polychromatic light channel 101, the chromatic dispersion device 102, the plurality of monochromatic light channels 103, the microfluidic channel 151, and the plurality of light sensing units 152 may be located on the same substrate, for example, they may be arranged in the same layer. For example, a patterning process may be used to form a pattern of the polychromatic light channel 101, the chromatic dispersion device 102, the plurality of monochromatic light channels 103, and the microfluidic channel 151 on a surface of the substrate 108, and then the plurality of light sensing units 152 on one side of the microfluidic channel 151. The pattern of the microfluidic channel 151 includes two parallel walls and a groove between the two walls. A hydrophobic layer or a hydrophilic layer may be arranged inside the microfluidic channel 151 (that is, on a surface of the groove), so that the microfluid flows or stays shortly in the microfluidic channel 151 as required. For example, a Teflon-AF hydrophobic layer can make the microfluid not be adhered to the microfluidic channel as much as possible, and enhance the fluidity of the microfluid.

Figure 9A:
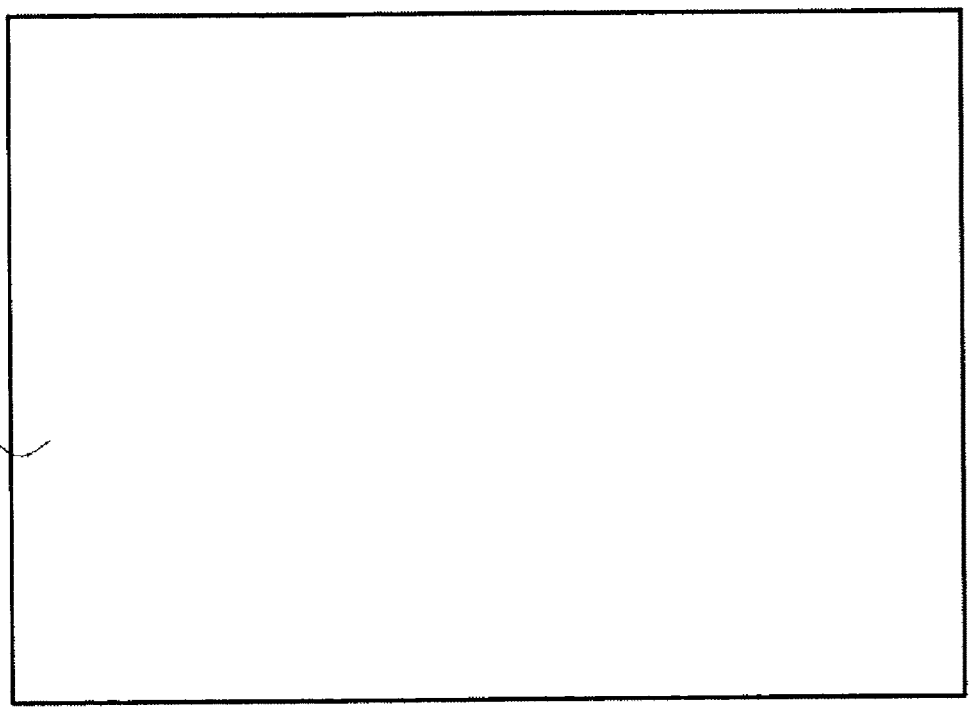
FIGS. 9A-9C are schematic structural views of an optical device in steps of a method for manufacturing the optical device according to an embodiment of the present disclosure.
Figure 12:
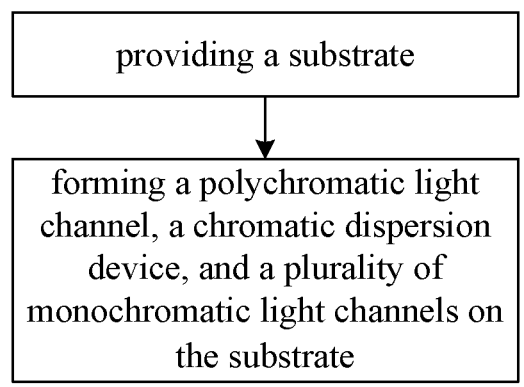
FIG. 12 shows a flowchart of a method for manufacturing an optical device according to an embodiment of the present disclosure.

Embodiments of the present disclosure further provide a method for manufacturing an optical device. As shown in FIG. 12, the method includes:

providing a substrate 108 (see FIG. 9A); and forming a polychromatic light channel, a chromatic dispersion device, and a plurality of monochromatic light channels on the substrate.

As described above, the polychromatic light channel may be configured to transmit a polychromatic light beam, and the polychromatic light channel is provided with a light incident surface for receiving the incident polychromatic light beam at an input end of the polychromatic light channel; the chromatic dispersion device is arranged downstream from the polychromatic light channel in the optical path, and the chromatic dispersion device is configured to split the polychromatic light beam from the polychromatic light channel into a plurality of monochromatic light beams; the plurality of monochromatic light channels are arranged downstream from the chromatic dispersion device in the optical path, the plurality of monochromatic light channels are configured to respectively conduct a plurality of monochromatic light beams of different colors from the chromatic dispersion device, and monochromatic light output surfaces are respectively provided at output ends of the plurality of monochromatic light channels and configured to output the monochromatic light beams.

In the embodiments of the present disclosure, the optical device includes a polychromatic light channel, a chromatic dispersion device, and a plurality of monochromatic light channels arranged on the same substrate, which simplifies the basic structure and the manufacturing method of the spectrum testing system. The optical device described in the embodiments of the present disclosure can be applied to the fields of physics, chemistry, biology, medicine, agronomy, etc., for material analysis or molecular analysis.

For example, the substrate may be a glass substrate having a thickness of 0.5-0.7 mm, a length of 10 mm and a width of 10 mm, respectively. Therefore, a miniature spectrometer can be implemented on a glass substrate having a size of about 10 mm*10 mm by means of a patterning process.

In some embodiments, the method further includes: forming a first cladding layer on a surface of the polychromatic light channel away from the substrate, and the refractive index of the first cladding layer is less than the refractive index of the polychromatic light channel.

Figure 9B:
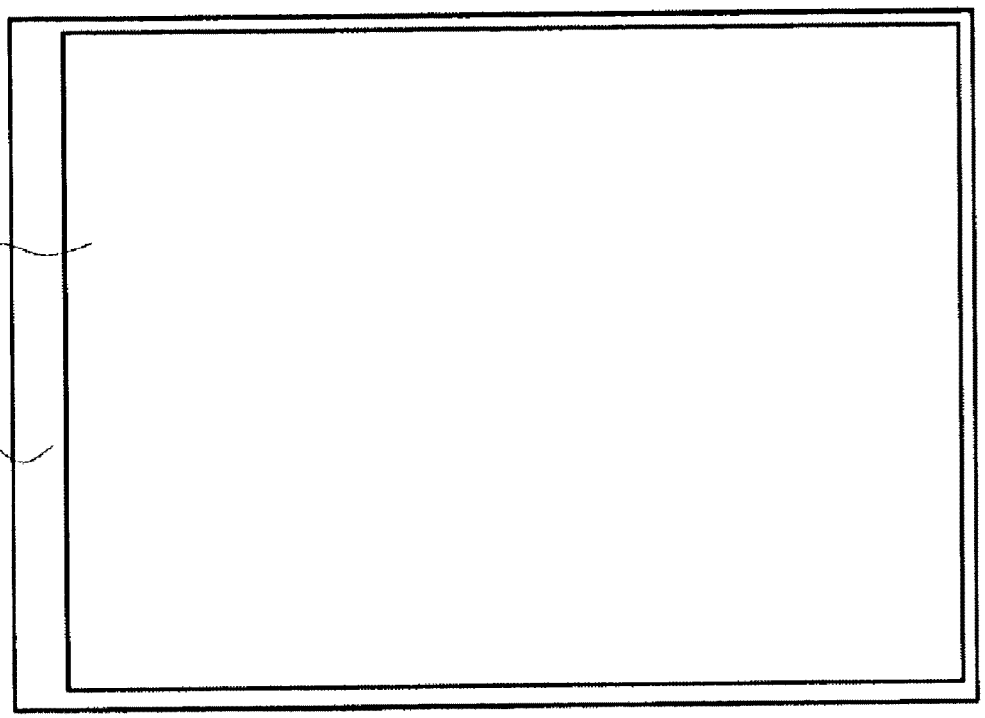
Figure 9C:
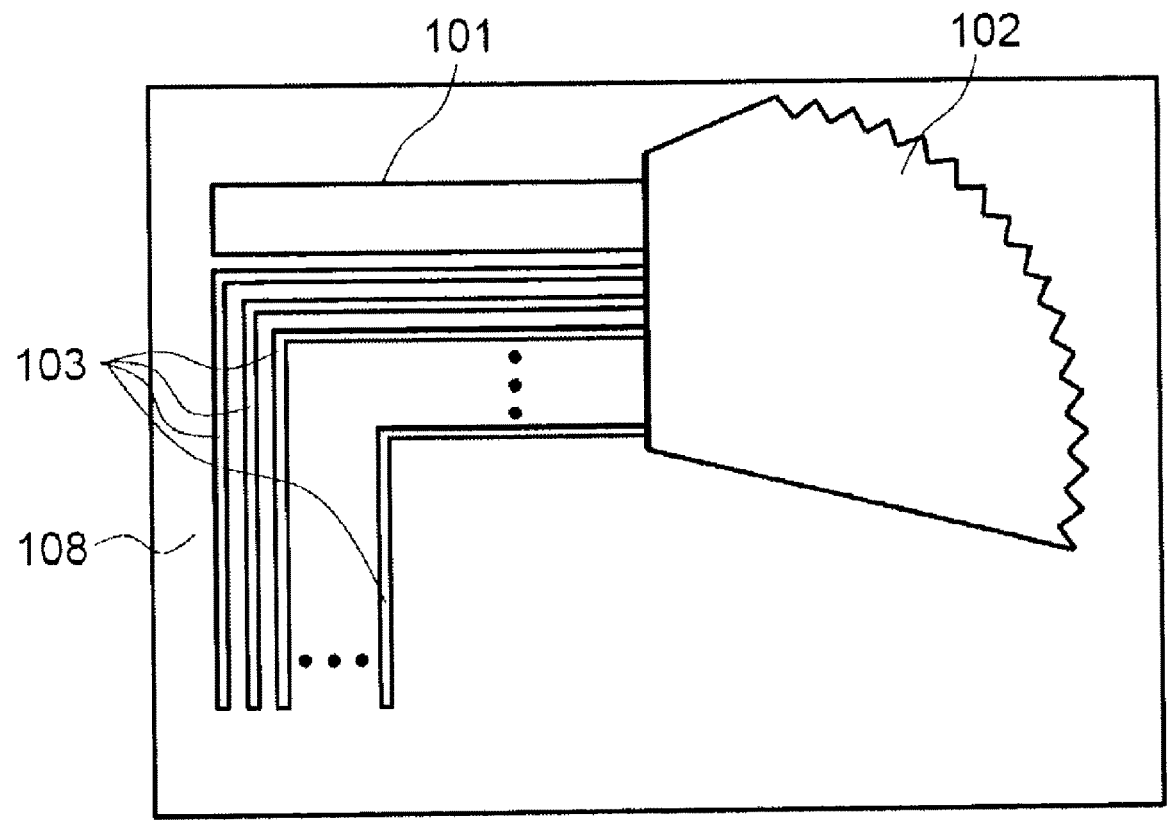
Figure 13:
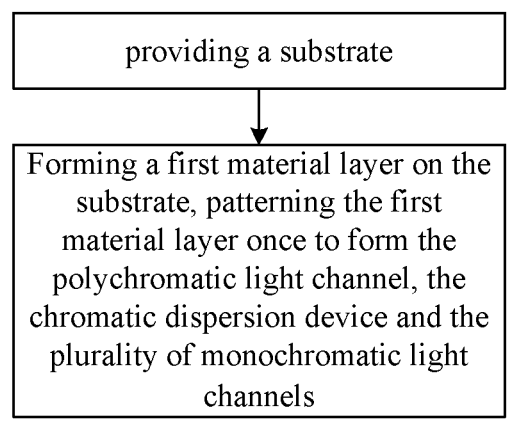
FIG. 13 shows a flowchart of a method for manufacturing an optical device according to another embodiment of the present disclosure.

For example, as shown in FIG. 13, in some embodiments, the step of forming a polychromatic light channel, a chromatic dispersion device, and a plurality of monochromatic light channels on the substrate includes: forming a first material layer 109 on the substrate 108 (as shown in FIG. 9B), patterning the first material layer 109 once to form the polychromatic light channel 101, the chromatic dispersion device 102, and the plurality of monochromatic light channels 103 (as shown in FIG. 9C).

Figure 10A:
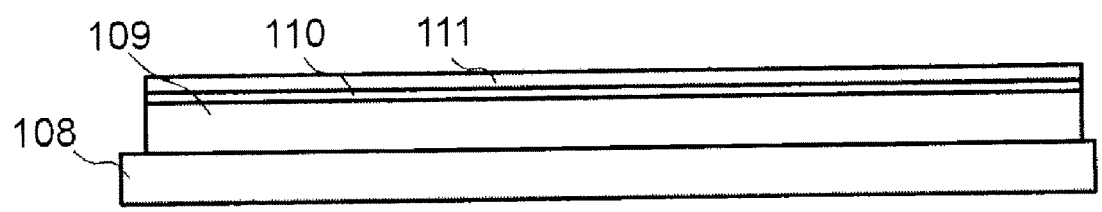
FIGS. 10A-10G are schematic structural views of an optical device in steps of a method for manufacturing the optical device according to another embodiment of the present disclosure.

For example, the substrate 108 is a glass substrate. The material of the first material layer 109 may be silicon nitride. The first material layer 109 (also referred to as a waveguide layer) may be deposited on the surface of the substrate 108, a hard mask layer (for example, an aluminum layer) 110 may be deposited on the surface of the first material layer 109, and then a first photoresist layer 111 is coated (for example, spin-coated) on the hard mask (as shown in FIG. 10A).

Figure 10B:
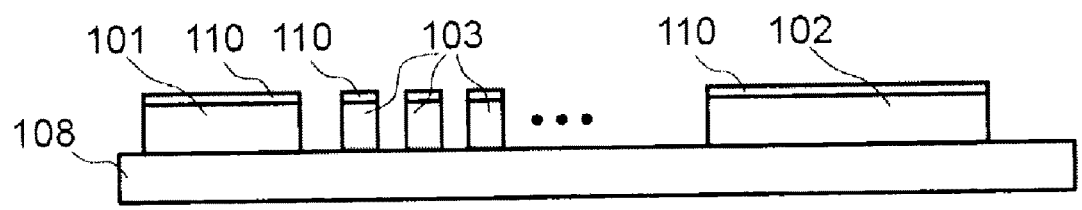

Next, the first photoresist layer 111, the hard mask layer, and the first material layer 109 are patterned one by one to form the polychromatic light channel 101, the chromatic dispersion device 102, and the plurality of monochromatic light channels 103. For example, an electron beam directwrite lithography (EBL) or a nanoimprint (NIP) is used to press the first photoresist layer to form the pattern corresponding to the polychromatic light channel 101, the chromatic dispersion device 102 (for example, the reflective blazed grating) and the plurality of monochromatic light channels 103. The hard mask layer is etched by wet etching to form a hard mask, and then a dry etching (for example, inductively coupled plasma (ICP) or reactive ion etching (RIE)) is used to form the polychromatic light channel 101, the chromatic dispersion device 102, and the plurality of monochromatic light channels 103 (as shown in FIG. 10B).

Figure 10C:
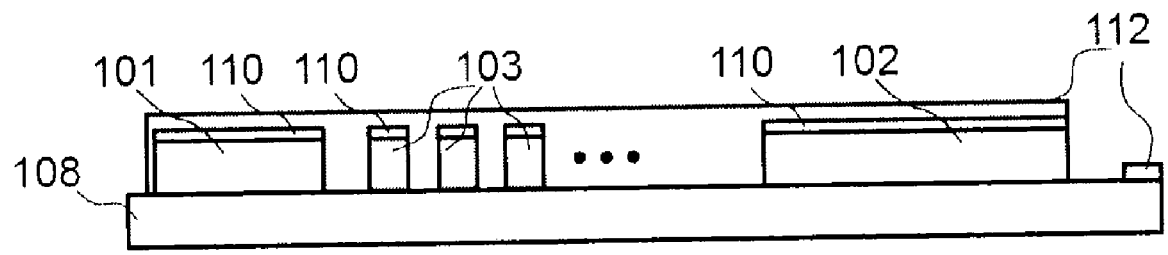

In some embodiments, in order to obtain an ideal grating profile (for example, a steeper side surface), an area that needs to be deeply etched (i.e., a peripheral area of the grating) may be further exposed (for example, by using a digital exposure process). Thereby, a deep channel is formed at the peripheral area of the grating. Specifically, as shown in FIG. 14, the method may further include:

coating a second photoresist layer 112 on the substrate 108 on which the polychromatic light channel 101, the chromatic dispersion device 102, and the plurality of monochromatic light channels 103 are formed (as shown in FIG. 10C); and patterning the second photoresist layer 112 (for example, by using a photolithography process) and etching the substrate 108 to form a channel based on the patterned second photoresist layer 112.

Figure 10D:
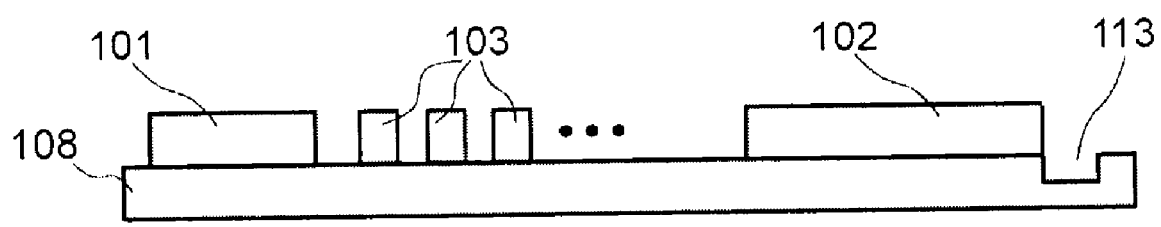

The unnecessary hard mask layer 110 may then be removed (as shown in FIG. 10D).

Figure 10E:
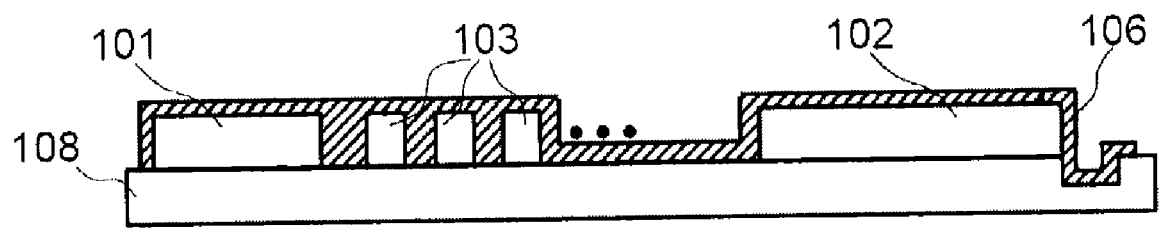
Figure 10F:
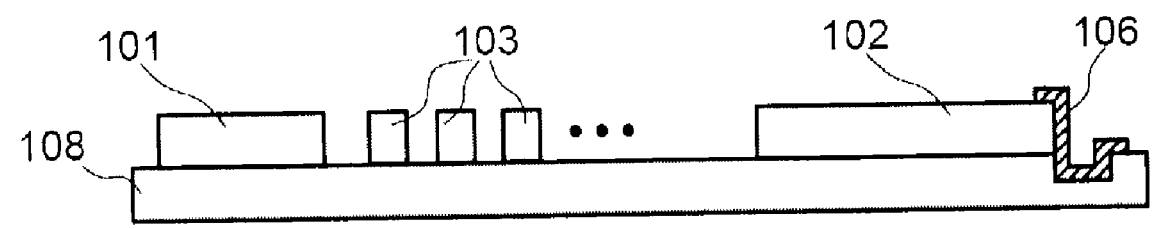
Figure 14:
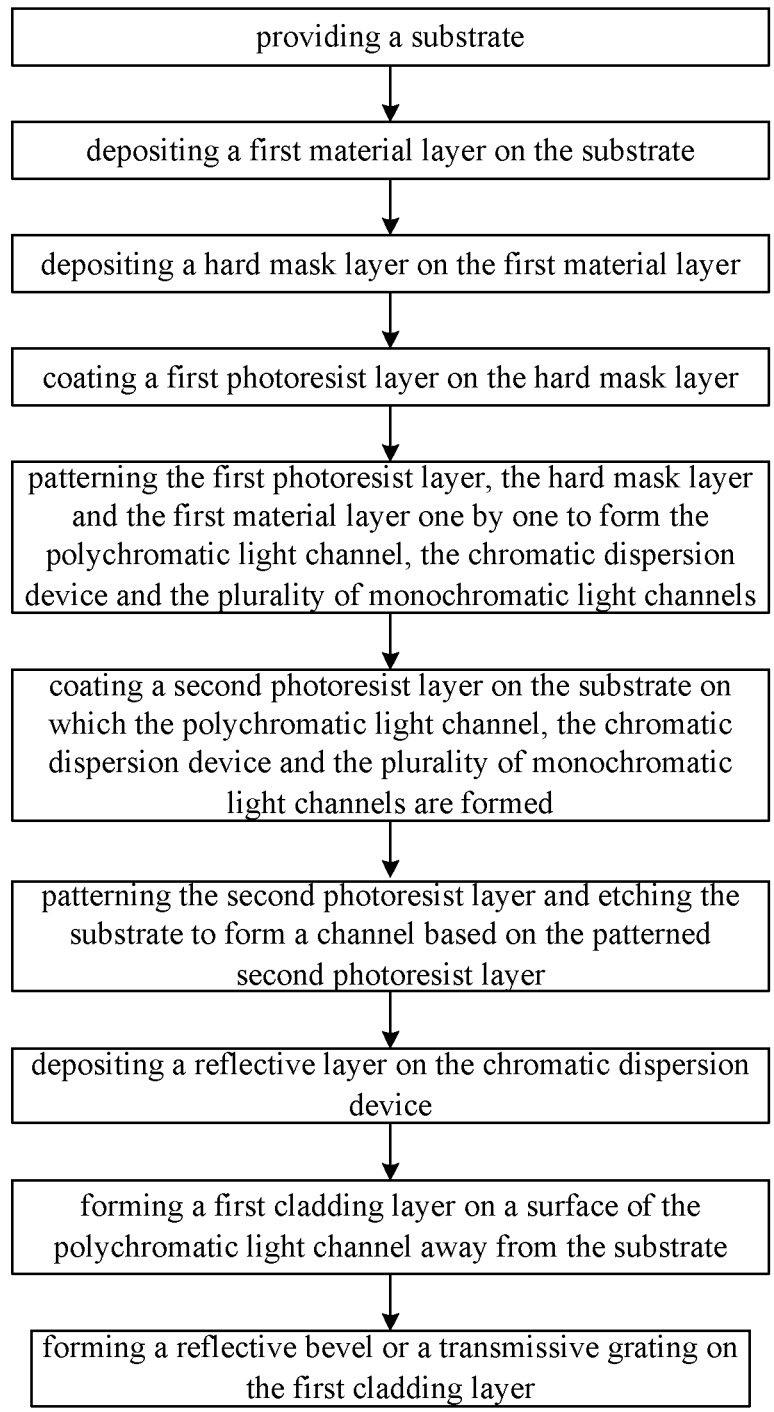
FIG. 14 shows a flowchart of a method for manufacturing an optical device according to still another embodiment of the present disclosure.

In some embodiments, in order to obtain a higher light utilization rate, as shown in FIG. 14, a reflective layer 106 (for example, a metal reflective layer) may be deposited on the chromatic dispersion device 102 (for example, on a side of the grating surface of the reflective blazed grating away from the polychromatic light output surface of the polychromatic light channel) (as shown in FIG. 10E). The material of the reflective layer may be, for example, aluminum or silver. The metal reflective layer 106 deposited on other regions may be removed by using, for example, a photolithography process (as shown in FIG. 10F).

Figure 10G:
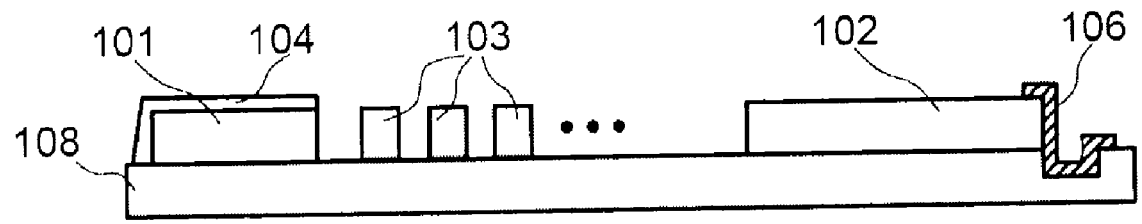

In some embodiments, as shown in FIG. 14, a first cladding layer 104 may be formed on a surface of the polychromatic light channel 101 away from the substrate 108. The first cladding layer 104 may be formed by for example spin-coating a resin with a lower refractive index on an upper surface of the polychromatic light channel 101. The first cladding layer 104 may further cover the light incident surface 1011 of the polychromatic light channel. As shown in FIG. 14, a reflective bevel 117 or a transmissive grating 107 may further be formed on the first cladding layer 104 (for example, by an electron beam direct-writing or nano-imprint process). The reflective bevel 117 or the transmissive grating 107 is located upstream from the light incident surface 1011 in the optical path and configured to guide the incident light beam into the light incident surface 1011, thereby improving light input efficiency (as shown in FIG. 10G).

In some embodiments, the step of forming the chromatic dispersion device may include forming a reflective blazed grating by a nanoimprint process. The grating surface of the reflective blazed grating faces the polychromatic light output surface of the polychromatic light channel.

By means of the nanoimprint process, it can reduce the cost and improve the accuracy and performance of the chromatic dispersion device.

With the optical device, the method for manufacturing the optical device, the light source system and the detection apparatus according to the embodiments of the present disclosure, the optical device includes a polychromatic light channel, a chromatic dispersion device, and a plurality of monochromatic light channels arranged in the same layer, which simplifies the basic structure and the manufacturing method of the spectrum testing system. The optical device described in the embodiments of the present disclosure can be applied to the fields of physics, chemistry, biology, medicine, agronomy, etc., for material analysis or molecular analysis.

The above only refers to the specific embodiments of the present disclosure, but the scope of the present disclosure is not limited thereto. Any change or substitution made by those skilled in the art within the technical scope of the present disclosure should be fallen into the scope of the present disclosure. Therefore, the scope of the present disclosure should be determined by the appended claim herein.

What is claimed is:

1. A spectral detection apparatus, comprising:
   an optical device, comprising an optical waveguide, wherein the optical waveguide comprises:
     a polychromatic light channel configured to transport a polychromatic light beam, and provided with a light incident surface for receiving an incident polychromatic light beam at an input end of the polychromatic light channel;
     a chromatic dispersion device arranged downstream from the polychromatic light channel in an optical path and configured to split the polychromatic light beam from the polychromatic light channel into a plurality of monochromatic light beams; and
     a plurality of monochromatic light channels arranged downstream from the chromatic dispersion device in the optical path and configured to respectively conduct the plurality of monochromatic light beams with different colors from the chromatic dispersion device,
   wherein monochromatic light output surfaces are respectively provided at output ends of the plurality of monochromatic light channels and configured to output the monochromatic light beams; and
   a measurement device opposite to the optical device,
   wherein the measurement device comprises a microfluidic channel and a plurality of light sensing units; the plurality of monochromatic light channels are arranged on one side of the microfluidic channel, the plurality of light sensing units are arranged on the other side of the microfluidic channel opposite to the plurality of monochromatic light channels; a light receiving surface of each light sensing unit faces a light output surface of one monochromatic light channel,
   and at least part of the microfluidic channel is arranged between light receiving surfaces of the plurality of light sensing units and light output surfaces of the plurality of monochromatic light channels such that the monochromatic light beams outputted by the monochromatic light channels pass through the microfluidic channel to reach the light sensing units;
   wherein the polychromatic light channel, the chromatic dispersion device, the plurality of monochromatic light channels, the microfluidic channel, and the plurality of light sensing units are arranged on a same substrate, and are arranged in a same layer; and
   wherein the optical device further comprises:
     a first cladding layer on a first side surface of the polychromatic light channel; and a second cladding layer on a second side surface of the polychromatic light channel,
wherein the second side surface is disposed opposite to the first side surface and closer to the substrate than the first side surface;
wherein a refractive index of the first cladding layer and a refractive index of the second cladding layer are both less than a refractive index of the polychromatic light channel;
wherein the first cladding layer further covers the light incident surface of the polychromatic light channel; and
wherein the light incident surface of the polychromatic light channel is substantially perpendicular to the second side surface of the polychromatic light channel;
wherein a reflective bevel is provided in the first cladding layer, the reflective bevel is located upstream from the light incident surface in the optical path and configured to guide an incident light beam into the light incident surface, and the reflective bevel is located on a side surface of first cladding layer away from the light incident surface of the polychromatic light channel; and an included angle is formed between the reflective bevel and the second side surface of the polychromatic light channel, wherein the included angle is an acute angle.

2. The spectral detection apparatus according to claim 1, wherein the optical device further comprises a substrate, wherein the polychromatic light channel, the chromatic dispersion device, and the plurality of monochromatic light channels are arranged on a same substrate.

3. The optical device according to claim 2, wherein monochromatic light output surfaces are arranged on sides of the monochromatic light channels facing towards the substrate or away from the substrate.

4. The spectral detection apparatus according to claim 1, wherein the second cladding layer is integrated with the substrate.

5. The spectral detection apparatus according to claim 1, wherein the polychromatic light channel, the chromatic dispersion device, and the plurality of monochromatic light channels are arranged in a same layer.

6. The spectral detection apparatus according to claim 1, wherein each of the plurality of monochromatic light channels comprises a sub-optical waveguide.

7. The spectral detection apparatus according to claim 1, wherein the polychromatic light channel, the chromatic dispersion device, and the plurality of monochromatic light channels are made of a same material.

8. The spectral detection apparatus according to claim 1, wherein the chromatic dispersion device comprises a reflective blazed grating.

9. The spectral detection apparatus according to claim 8, wherein the optical device further comprises a reflective layer disposed on a side of a grating surface of the reflective blazed grating away from a polychromatic light output surface of the polychromatic light channel.

10. The spectral detection apparatus according to claim 1, wherein the monochromatic light output surface of each monochromatic light channel is provided with mesh dots or an extraction grating for outputting one of the plurality of monochromatic light beams.

11. The spectral detection apparatus according to claim 1, wherein the optical device further comprises a light source for emitting the polychromatic light beam, wherein the light incident surface is arranged to receive the polychromatic light beam from the light source.

12. A spectral detection apparatus, comprising:
an optical device, comprising an optical waveguide, wherein the optical waveguide comprises:
a polychromatic light channel configured to transport a polychromatic light beam, and provided with a light incident surface for receiving an incident polychromatic light beam at an input end of the polychromatic light channel;
a chromatic dispersion device arranged downstream from the polychromatic light channel in an optical path and configured to split the polychromatic light beam from the polychromatic light channel into a plurality of monochromatic light beams; and
a plurality of monochromatic light channels arranged downstream from the chromatic dispersion device in the optical path and configured to respectively conduct the plurality of monochromatic light beams with different colors from the chromatic dispersion device,
wherein monochromatic light output surfaces are respectively provided at output ends of the plurality of monochromatic light channels and configured to output the monochromatic light beams; and
a measurement device opposite to the optical device,
wherein the measurement device comprises a microfluidic channel and a plurality of light sensing units; the plurality of monochromatic light channels are arranged on one side of the microfluidic channel, the plurality of light sensing units are arranged on the other side of the microfluidic channel opposite to the plurality of monochromatic light channels; a light receiving surface of each light sensing unit faces a light output surface of one monochromatic light channel,
and at least part of the microfluidic channel is arranged between light receiving surfaces of the plurality of light sensing units and light output surfaces of the plurality of monochromatic light channels such that the monochromatic light beams outputted by the monochromatic light channels pass through the microfluidic channel to reach the light sensing units;
wherein the polychromatic light channel, the chromatic dispersion device, the plurality of monochromatic light channels, the microfluidic channel, and the plurality of light sensing units are arranged on a same substrate, and are arranged in a same layer; and
wherein the optical device further comprises:
a first cladding layer on a first side surface of the polychromatic light channel; and
a second cladding layer on a second side surface of the polychromatic light channel,
wherein the second side surface is disposed opposite to the first side surface and closer to the substrate than the first side surface;
wherein a refractive index of the first cladding layer and a refractive index of the second cladding layer are both less than a refractive index of the polychromatic light channel;
wherein the first cladding layer further covers the light incident surface of the polychromatic light channel;
wherein the light incident surface is arranged at a surface of the polychromatic light channel on a side away from the substrate, and the first cladding layer comprises a transmissive grating arranged on a side of the light incident surface away from the substrate and configured to direct the light incident beam into the light incident surface; and wherein an orthographic projection of the transmissive grating on a plane where the light incident surface of the polychromatic light channel is located is within the light incident surface.

* * * * *